Dec. 16, 1969 H. J. KNEUBUEHL 3,483,847
POULTRY WATER CUP AND VALVE
Filed April 23, 1968 3 Sheets-Sheet 1
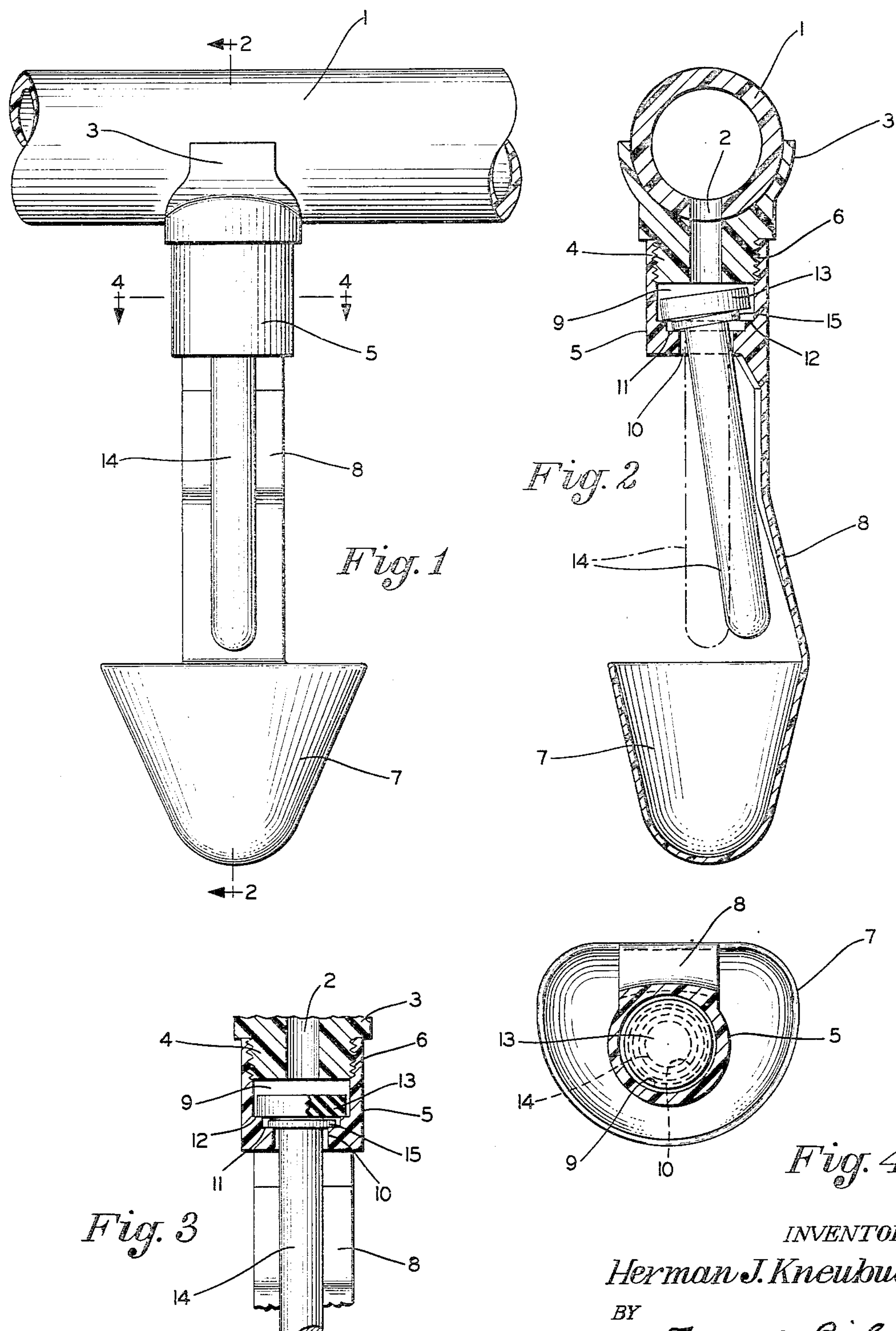
INVENTOR.
Herman J. Kneubuehl
BY
Frease & Bishop
ATTORNEYS

POULTRY WATER CUP AND VALVE

Filed April 23, 1968 3 Sheets-Sheet 2

INVENTOR.
Herman J. Kneubuehl
BY
Frease & Bishop
ATTORNEYS

POULTRY WATER CUP AND VALVE

Filed April 23, 1968 3 Sheets-Sheet 3

INVENTOR.
HERMAN J. KNEUBUEHL
BY Hamilton, Cook,
Renner & Kenner
ATTORNEYS

United States Patent Office 3,483,847
Patented Dec. 16, 1969

3,483,847
POULTRY WATER CUP AND VALVE

Herman J. Kneubuehl, Rte. 1, Sterling, Ohio 44276

Continuation-in-part of application Ser. No. 578,725, Sept. 12, 1966. This application Apr. 23, 1968, Ser. No. 729,870
Int. Cl. A01k *39/02*
U.S. Cl. 119—75 3 Claims

ABSTRACT OF THE DISCLOSURE

A water dispenser and cup apparatus being supplied with water through a valve. The valve has two seats and is operated unconsciously by the chicken upon a tilting of a valve stem. The stem itself is positioned with respect to the cup so that the chicken will tilt it when the water level is low, thereby refilling the cup.

CROSS REFERENCE TO RELATED APPLICATION

The subject application is a continuation-in-part of my copending United States application, Ser. No. 578,725, filed Sept. 12, 1966, now abandoned.

BACKGROUND OF THE INVENTION

It is common practice to equip chicken houses with a multiplicity of self-closing jet valves connected to a water supply and adapted to be operated by chickens pecking or nibbling at the same. One such device includes a movable valve member which a chicken must push inwardly with its beak in order that water will be emitted therefrom.

A problem with such a device, however, is that the valve must be held closed by sufficient force, as by water pressure, yet be able to be opened with a force that a chicken can exert. Further, since most of these "push in" type valves are located near the bottom of the water cup, not only are they in an awkward position and hard for a chicken to push straight in but also would tend to be clogged with feed falling off the chicken's beak. Many chickens never learn to operate this type valve and therefor dehydrate, stay unproductive or die. It was proposed to add a leveraged trigger to this type of valve; however, this arrangement tends to be even more susceptible to becoming clogged with feed which prevents it from opening or closing properly.

As a solution, a valve was developed comprising a length of rod contained loosely in the outlet from the device and having an O-ring attached to its upper end to provide a self-closing valve. However, due to the use of the O-ring, this device is limited to a very critical tolerance as the O-ring must seal against the rod and also against the valve seat in order that the valve be self-closing. Also the sealing surface of the O-ring is so small that the slightest particle of sediment would prevent the valve from closing and therefore leak water.

An inherent problem under either of the above systems is that the chicken must learn to activate the valve itself when desiring water. Under the first method described above, if the chicken can muster up enough strength to depress the valve, and, of course, if the valve is not clogged by food bits, then the cup provided therewith can be filled. However, in this regard it has been found that many chickens never learn to operate the valve and therefor dehydrate.

Under the second system described above, usually a cup is not provided. Rather the chicken will learn to drink the water as it runs down the rod. Again, however, not all the water which is emitted can be consumed and the result is wet chickens and soaked droppings on the floor.

Even after the chickens have learned to activate the valves of the prior art, however, and particularly on a horizontal mounted valve, when the water pressure drops, the valve will fall away from the valve seat and the water remaining in the line will leak out and flood the floor.

SUMMARY OF THE INVENTION

It is thus a general object of the present invention to provide a self-closing valve and cup system which will overcome the above disadvantages and difficulties.

Another object of the present invention is to provide a device, as above, which the chickens may unconsciously operate, by shoving their beaks against the valve stem when the water level in the drinking cup becomes low, thus tilting the valve stem and opening the valve so as to refill the drinking cup.

A further object of the present invention is to provide a device, as above, comprising a flat rubber disc adapted to seat upon a flat seat within the valve chamber, and a tilting valve stem in the form of a headed pin adapted to unseat the disc when tilted from its normal position.

It is yet another object of the present invention to provide a two-seated valve that will not leak when the water pressure drops and provides enough leverage so that a chicken can open the valve unconsciously and easily.

It is still another object of the present invention to provide a device, as above, in which the valve stem is positioned with respect to the cup so that the chickens will not activate the valve until water is needed.

It is a still further object of the present invention to provide a device, as above, which will not become clogged by feed accumulating in the cup, this being accomplished by the lack of any obstructions above the cup. In this manner the chicken is able to reach water and operate the volve from all directions thus making it possible for the bird to keep the cup absolutely clean by being able to eat any feed anywhere in the cup that would otherwise accumulate.

These and other objects of the invention, as well as the advantages thereof over existing prior art forms, will become apparent from the following detailed description of the attached drawings and are accomplished by means hereinafter described and claimed.

The invention may be briefly described in general terms as comprising a valve casing having a generally upwardly open, internally threaded end adapted to be attached to one of the usual depending outwardly threaded outlet nipples commonly attached at intervals to water supply pipes in chicken houses.

The valve casing has a discharge outlet, concentric with which are located two adjacent valve seats, one of which is of greater diameter than the other. A valve in the form of a flat rubber disc is normally seated upon the one valve seat, and the head of the valve stem is seated upon the other seat; the stem extending through the outlet and being of smaller diameter than the outlet.

The parts are so proportioned that when the valve stem and valve are both seated upon their respective seats, there is a slight clearance between the head of the valve stem and the disc, whereby the disc valve will always be tightly seated upon its seat except when moved therefrom by tilting of the stem. A drinking cup is provided with the valve by means of a strap or the like connected to or formed integrally with one side of the valve casing.

DESCRIPTION OF THE DRAWINGS

FIG. 1 is a front elevation of a drinking cup and valve embodying the present invention, showing the same attached to an outlet of a water supply pipe.

FIG. 2 is a vertical, sectional view, taken substantially on the line 2—2 of FIG. 1, showing the valve stem tilted to raise the disc valve from its seat.

FIG. 3 is a fragmentary, vertical, sectional view through the valve chamber, showing the disc seated in closed position and showing the valve stem normally hanging in vertical position.

FIG. 4 is a transverse sectional view, taken substantially on line 4—4 of FIG. 1.

DESCRIPTION OF THE PREFERRED EMBODIMENTS

Figure 5:
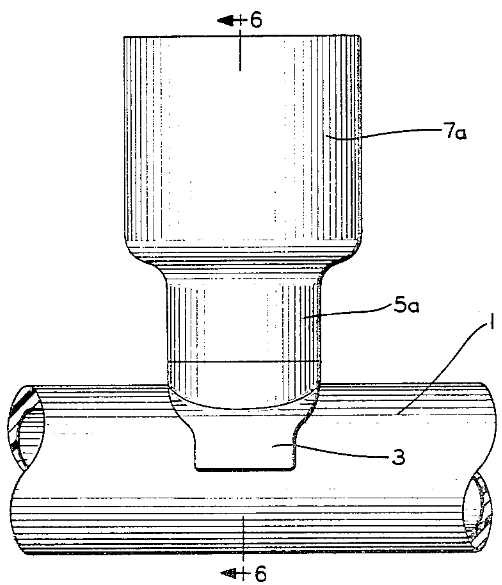
FIG. 5 is a side elevation of another embodiment of the invention in which the drinking cup is located above the valve casing.

Reference is now made to the embodiment illustrated in FIGS. 1 to 4 of the drawings, in which similar numerals refer to similar parts throughout.

A usual water supply pipe or tube for chicken houses is indicated as numeral 1. As illustrated, this pipe is preferably in the form of plastic tubing which is provided at desired intervals with outlets 2 in its lower side to which are connected, as by cement, the usual outlet members comprising a saddle portion 3 and a depending exteriorly threaded outlet nipple 4. The above is common construction and forms no part of the present invention which is described as follows.

The valve casing 5 is of generally cylindrical form, the open upper end thereof having the internal threads 6 for attaching to the exteriorly threaded outlet nipple 4. Although this valve casing, as well as the drinking cup connected thereto may be formed of metal, it is preferably formed of suitable plastic material as shown in the drawings. The drinking cup 7 is suspended from the valve casing 5 as by the strap 8.

Within the valve casing 5 is the valve chamber 9 having the downwardly disposed outlet 10 at its lower end. Above the outlet 10 are the stepped seats 11 and 12, the seat 12 being of considerably greater diameter than the seat 11.

The valve is in the form of a rubber disc 13, the flat bottom side of which normally rests upon the flat upper valve seat 12. The valve stem 14 has a head 15 which rests upon the lower seat 11 and is of a smaller diameter than disc 13.

As is apparent in FIGS. 2 and 3, the valve stem 14 is of smaller diameter than the outlet opening 10, so that it may be tilted, as to the full line position shown in FIG. 2, to open the valve 13. It will also be seen from an inspection of FIG. 3 that there is a clearance between the top of the head 15, of the valve stem 14, and the bottom of the disc valve 13, so that the disc valve 13 will normally seat tightly upon its seat 12 by pressure of the water above the same. It is also apparent that since head 15 is of a smaller diameter than disc 13, a small amount of tilting of stem 14 is translated into a more appreciable movement of disc 13.

As shown in FIGS. 1 and 2, the lower end of the valve stem 14 is located in proximity to the drinking cup 7. When the water level in the cup 7 is near the top of the cup, a chicken may drink therefrom from any point around the same without touching the valve stem 14.

However, when the water level is considerably lower in the cup, a chicken reaching down therein to drink, from any side of the cup, will unconsciously strike the valve stem 14 with its head, tilting the valve stem and raising the disc valve 13 as shown in FIG. 2, so as to replenish the water supply in the cup.

This will happen whenever a chicken drinks from the cup, until the water level is raised to a point near the top of the cup, when chickens may again drink therefrom without touching the valve stem 14.

Figure 6:
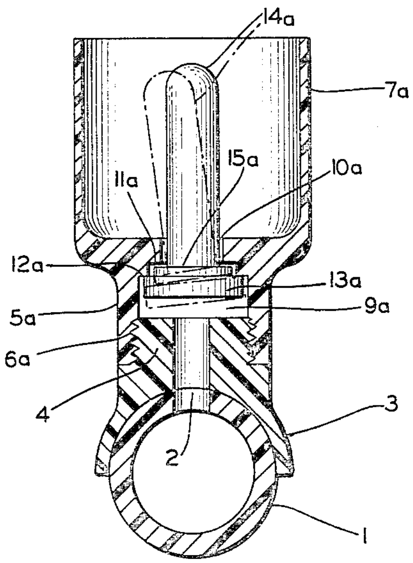
FIG. 6 is a transverse section taken substantially on line 6—6 of FIG. 5.

Referring now to the embodiment of the invention illustrated in FIGS. 5 and 6, the usual water supply pipe or tube is indicated at 1 and the outlet 2 thereof is located in the top of the pipe or tube. The usual outlet member, comprising the saddle portion 3 and exteriorly threaded outlet nipple 4, is cemented upon the top of the tube 1 to register with the outlet 2 therein.

The valve casing **5*a* may be of generally cylindrical form, the lower open end thereof having the internal threads 6*a* for attaching to the exteriorly threaded outlet nipple 4. The drinking cup 7*a*** is shown as formed upon the upper end of the valve casing.

Within the valve casing **5*a* is the valve chamber 9*a* having the upwardly disposed outlet 10*a* at its upper end communicating with the bottom of the drinking cup 7*a*. Below the outlet 10*a* are the stepped seats 11*a* and 12*a*, the seat 12*a* being of considerably greater diameter than the seat 11*a***.

The valve is preferably in the form of a rubber disc **13*a*, the flat upper surface of which is normaly held seated upon the seat 12*a* by water pressure only from the water supply tube 1. The valve stem 14*a* has a head 15*a* adapted to seat against the upper seat 11*a***.

In the same manner as above described, it will be seen from an inspection of FIG. 6 that the valve stem **14*a* is of smaller diameter than the outlet 10*a*, so that it may be tilted from the full line position to the broken line position shown in said figure, to open the valve 13*a***.

As best shown in FIG. 6, the valve stem **14*a* is so positioned within the drinking cup 7*a*** that when the water level in the cup is near the top thereof, a chicken may drink therefrom from any point around the same without touching the valve stem with its beak or head.

However, when the water level is considerably lowered in the cup, a chicken reaching down therein to drink from any side of the cup, will unconsciously shove the valve stem **14*a* with its beak, tilting the valve stem 14*a* and moving the valve 13*a* off of its seat, as shown in broken lines in FIG. 6, so as to permit water to flow upwardly through the outlet 10*a*** into the cup.

Figure 8:
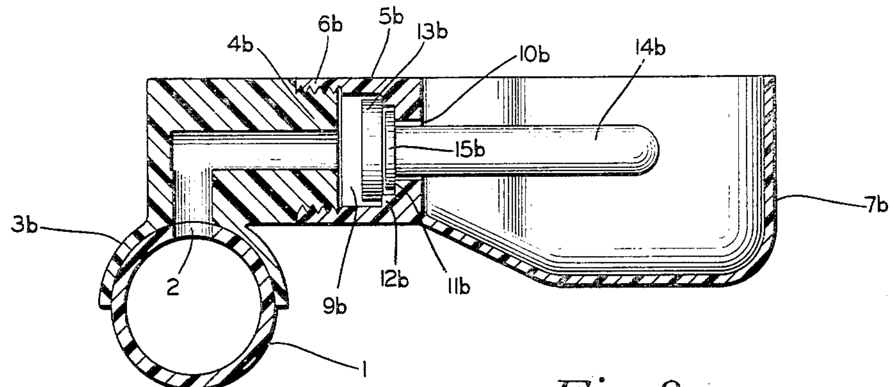
FIG. 8 is a vertical section taken substantially on line 8—8 of FIG. 7.
Figure 7:
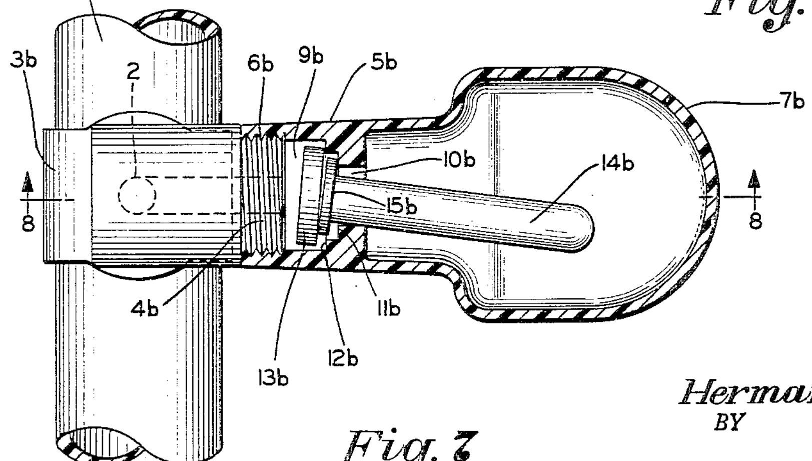
FIG. 7 is a top plan view, partly in section, of a third embodiment of the invention in which the outlet is in one side of the valve casing, the drinking cup is located upon that side of the valve casing and the valve stem extends through the outlet horizontally into the drinking cup.

In FIGS. 7 and 8 is shown still another embodiment of the invention. The usual water supply pipe or tube is indicated at 1 and the outlet 2 may be formed in the top thereof, as shown in FIG. 8.

An outlet member, comprising a saddle portion **3*b* and an angularly disposed threaded outlet nipple 4*b*, is cemented to the top of the water supply tube 1 to register with each outlet opening 2 in the tube. The valve casing 5*b* may be of generally cylindrical form, the inner open end thereof having the internal threads 6*b* for attaching to the exteriorly threaded outlet nipple 4*b*. The drinking cup 7*b* is formed upon the outer end of the valve casing 5*b***.

The valve chamber **9*b* is located within the valve casing 5*b* and has at one side the outwardly disposed outlet 10*b*. Within the chamber 9*b* are the stepped seats 11*b* and 12*b*, the seat 12*b* being of greater diameter than the seat 11*b***.

The valve is preferably in the form of a rubber disc **13*b*, the flat outer side of which is normally held against the seat 12*b* by water pressure only from within the supply tube 1. The value stem 14*b* has a head 15*b* which rests upon the outer smaller diameter seat 11*b***.

As seen in FIGS. 7 and 8, the valve stem **14*b* is of smaller diameter than the outlet opening 10*b* so that it may be tilted, as shown in FIG. 7, to open the valve 13*b*. As illustrated, the valve stem 14*b*** is located within the cup 7*b*. When the water level in the cup is near the top thereof, a chicken may drink therefrom without touching the valve stem 14*b*. If the water level is lowered in the cup, a chicken reaching down therein to drink from any side of the cup will unconsciously shove the valve stem with its beak, tilting the valve stem as shown in FIG. 7, and moving the valve 13*b* from its seat so as to permit water to flow through the outlet 10*b* into the drinking cup 7*b* to refill the same.

Figure 9:
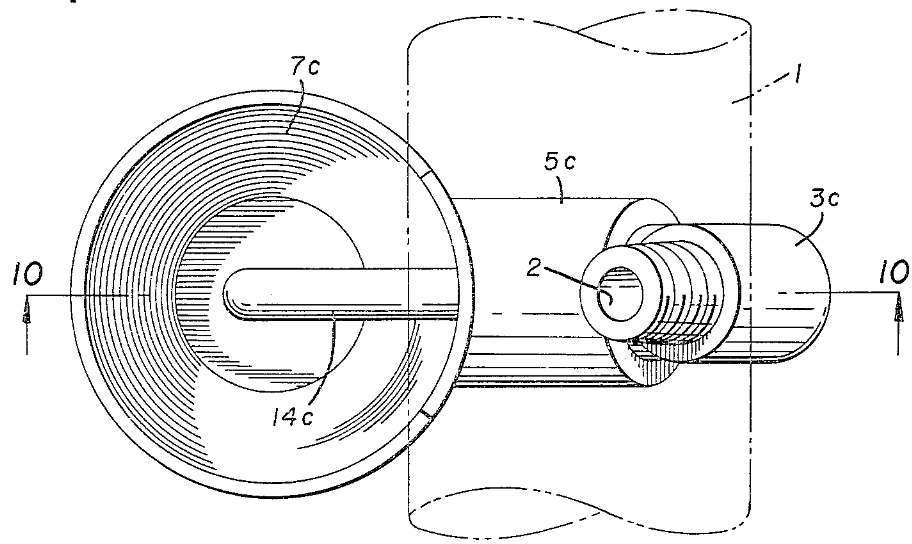
FIG. 9 is a top plan view of a fourth embodiment of the present invention.
Figure 10:
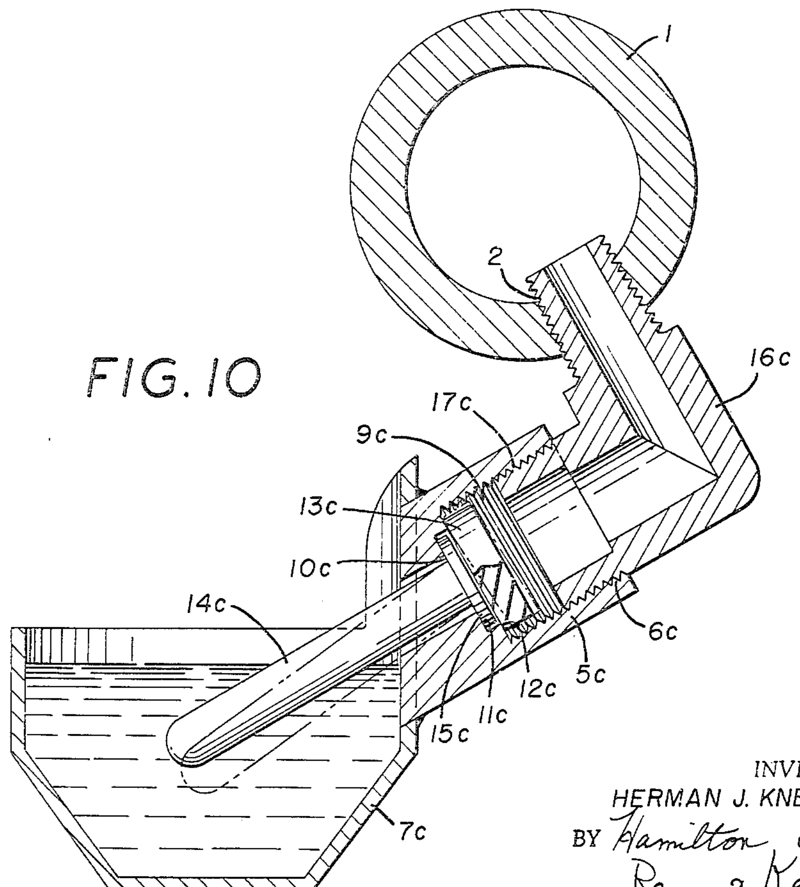
FIG. 10 is a transverse sectional view taken substantially on line 10—10 of FIG. 9.

Still another embodiment of the present invention is shown in FIGS. 9 and 10. This embodiment was developed after it was found that the previous embodiments were not satisfactory under all conditions. For example, in the embodiment of FIGS. 1–4, inclusive, it was found that not all chickens will strike valve stem 14 unconsciously but rather some will peck at it purposely resulting in an overflow of cup 7. In both the embodiments shown in FIGS. 5 and 6 and FIGS. 7 and 8, it has found that if a large enough and constant water pressure is not supplied through pipe 1, these valves will leak. Further, the outlet openings 10*a* and 10*b*, being under water, often tend to clog up with chicken feed, as was a problem in the prior art. This is particularly true with respect to the FIGS. 5 and 6 embodiment.

The FIGS. 9 and 10 embodiment is one which will work under all conditions; that is, it will not be effected by such variables as water pressure of the supply pipe or personality of the chickens involved.

Here again the water supply pipe 1 has an outlet 2 into which is threaded a 90° elbow 16*c* which has at its other end, an exteriorly threaded outlet 17*c*. The valve casing 5*c* is of generally cylindrical form, the open upper end thereof having internal threads 6*c* for attaching to the exteriorly threaded outlet 17*c*. The drinking cup 7*c* is shown as formed upon the lower end of the valve casing 5*c*.

Within the valve casing 5*c* is the valve chamber 9*c* having outlet 10*c* at its lower end. Above the outlet 10*c* are the stepped valve seats 11*c* and 12*c*, seat 12*c* being of considerably greater diameter than seat 11*c*.

The valve is in the form of a rubber disc 13*c*, the flat bottom side of which normally rests upon the flat upper valve seat 12*c*. The valve stem 14*c* has a head 15*c* which rests upon the lower seat 11*c*. The valve stem 14*c* is of smaller diameter than the outlet opening 10*c*, so that it may be tilted, as to the chain line position shown in FIG. 10, to open the valve 13*c*. It will also be seen from an inspection of FIG. 10 that there is a clearance between the top of the head 15*c*, of the valve stem 14*c*, and the bottom of the disc valve 13*c*, so that the disc valve 13*c* will normally seat tightly upon its seat 12*c* by pressure of the water above the same.

As best seen in FIG. 10, the lower end of the valve stem 14*c* is substantially under water with only a short portion of its upper end visible, while the outlet 10*c* is spaced above the water level. When the water level in the cup 7*c* is near the top, a chicken may drink therefrom without striking the stem. Even those chickens which tend to receive their water from the stem, as was described as a deficiency of the FIGS. 1–4, inclusive embodiment, will now drink water from the cup and not tend to peck the stem. Further, the outlet 10*c*, being well above the water level, will not become clogged up with feed from the chicken's bill.

From the above it will be seen that in all embodiments, the large disc surface gives more water pressure to normally hold the valve closed, and that the long valve stem gives considerable leverage for opening the valve, whereby it may be easily opened by chickens contacting the same with the beak consciously or unconsciously.

It will also be evident that the device is a considerable improvement over such devices as are now used for furnishing water to poultry and the like, as it causes the chickens to automatically refill the water cup when the water level therein is low, while permitting and encouraging chickens to drink from the full cup without striking the valve stem and opening the valve. Thus, no water is wasted, making it possible to use expensive medication in the drinking water without waste, and eliminating the necessity of a drain-off for the water.

The valve construction comprising the valve chamber with superposed seats, the flat rubber disc valve and the headed valve stem for operating the valve has been found to be a much simpler, more practical, and more efficient device than the prior valve referred to above which uses an O-ring. It is obvious that the improved valve construction to which the invention pertains is not limited to such critical tolerances as in the prior valve with the O-ring nor is it susceptible to leakage or great rushes of water when activated. Rather a steady, even flow of water is provided when the chicken unconsciously shoves the valve stem.

By providing the drinking cup combination with and in a fixed relationship to this valve, the floor and/or litter or manure remains dry, as there is dripping water upon the floor. Since there is nearly always some water in the bottom of the cup, the chickens readily and automatically learn to operate the valve and will not pick holes in the bottom of the cups as commonly happens with the use of other drinking cups now on the market.

As shown in the FIGS. 9 and 10 embodiment, when the water level is low, the chickens lower their beaks and push between or under the valve stem and the wall of the cup thereby raising the water level high enough for drinking. This can be done unconsciously even while the chicken is drinking. Only a low water level is required for the chickens to be able to drink, therefore chickens will not overflow the cup. When water level gets high, the chickens will back up their beak and no more water will flow until the water level is too low for drinking, then the chicken's beak will unconsciously push deeper and therefore open the valve again. At times, additional leverage is applied when a chicken thrusts its beak between the stem and wall of the cup.

The use of the cup below the valve also saves feed. Chickens usually have some feed upon their beaks when they drink, and this will be washed off of their beaks and settle to the bottom of the cup which they will later eat the same.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

I claim:

1. A dispenser comprising, a watering cup and a valve casing, said valve casing having a chamber therein and an outlet therefor, said outlet being directed into said watering cup, means for connecting said chamber to a source of water under pressure, a first seat in said chamber, a tiltable valve normally seated on said first seat closing said outlet due to the water pressure in said chamber said means for connecting said chamber to a source of water including a portion removably disposed within said valve casing supporting the same and retaining said tiltable valve within said chamber, a second seat in said chamber, said second seat being spaced away from and of a smaller diameter than said first seat, a tiltable valve stem having a head on one end normally seated upon said second seat with a slight clearance between said head and said valve, said valve stem extending loosely through said outlet outwardly of said valve casing and being of a smaller diameter than said outlet and said head, said valve stem extending to a position proximate the watering cup whereby a fowl drinking from the watering cup engages and tilts said stem to unseat said head which contacts and unseats said valve to momentarily discharge some water into the cup.

2. A dispenser, as in claim 1, wherein the lower end of said valve stem extends well below an upper edge of the watering cup.

3. A dispenser, as in claim 2, wherein said valve stem is inclined with respect to said watering cup and a relatively small portion of said valve stem is exposed above the upper edge of said watering cup.

References Cited

UNITED STATES PATENTS

| | | | |
|---|---|---|---|
| 304,165 | 8/1884 | Brown | 119—75 |
| 326,829 | 9/1885 | Balch | 119—75 |
| 561,453 | 6/1896 | Thayer | 119—75 |
| 1,986,928 | 1/1935 | Hanson | 119—75 |
| 2,319,928 | 5/1943 | Hart | 119—75 |
| 2,541,369 | 2/1951 | Kofford | 119—72.5 |
| 2,710,594 | 6/1955 | Thompson | 119—72.5 |
| 2,851,007 | 9/1958 | Kagan | 119—72.5 |

HUGH R. CHAMBLEE, Primary Examiner

U.S. Cl. X.R.

119—72.5